United States Patent
Deng et al.

(10) Patent No.: US 10,935,378 B2
(45) Date of Patent: Mar. 2, 2021

(54) SYSTEM AND METHOD FOR ANGLE MEASUREMENT

(71) Applicant: TUSIMPLE, INC., San Diego, CA (US)

(72) Inventors: Fuheng Deng, San Diego, CA (US);
Renyuan Zhang, San Diego, CA (US);
Lei Nie, San Diego, CA (US); Yuhe Jin, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 18 days.

(21) Appl. No.: 15/985,599

(22) Filed: May 21, 2018

(65) Prior Publication Data

US 2019/0353478 A1 Nov. 21, 2019

(51) Int. Cl.
*G01B 11/26* (2006.01)
*G01S 17/89* (2020.01)
*G06T 7/246* (2017.01)
*G01P 3/36* (2006.01)

(52) U.S. Cl.
CPC ............... *G01B 11/26* (2013.01); *G01P 3/36* (2013.01); *G01S 17/89* (2013.01); *G06T 7/246* (2017.01); *G06T 2207/10028* (2013.01)

(58) Field of Classification Search
CPC . G01B 11/26; G01P 3/36; G06T 7/246; G06T 2207/10028; G01S 17/89; G01S 17/50; G01S 17/00; G01S 17/06; G01S 17/08; G01S 2013/9378; B60D 1/30
See application file for complete search history.

(56) References Cited

U.S. PATENT DOCUMENTS

| | | | | |
|---|---|---|---|---|
| 7,085,637 B2* | 8/2006 | Breed | ............... | B60W 50/00 701/38 |
| 7,202,776 B2* | 4/2007 | Breed | ............... | G05D 1/024 340/435 |
| 8,380,384 B2* | 2/2013 | Lee | ............... | G06T 7/246 701/28 |
| 9,074,878 B2* | 7/2015 | Steffey | ............... | G01S 17/86 |
| 9,086,273 B1* | 7/2015 | Gruver | ............... | G01S 7/4815 |
| 9,086,481 B1* | 7/2015 | Dowdall | ............... | G01S 13/867 |

(Continued)

FOREIGN PATENT DOCUMENTS

CN 108761481 A 11/2018

OTHER PUBLICATIONS

"Stabilization, Sensor Fusion and Path Following for Autonomous Reversing of a Full-scale Truck and Trailer System"—Master of Science in Electrical Engineering Department of Electrical Engineering, Linkoping University, 2016, by Nyberg. (Year: 2016).*

(Continued)

*Primary Examiner* — Mohamed K Amara
(74) *Attorney, Agent, or Firm* — Paul Liu; Julie J. Muyco; Perkins Coie, LLP.

(57) ABSTRACT

A system for generating a ground truth dataset for motion planning is disclosed. The system includes: a collecting module configured to collect LiDAR scans; a detecting module configured to detect two pose estimates that are closest to LiDAR scan accusation time; a determining module configured to determine LiDAR's poses based on an interpolation; and a transforming module configured to transform LiDAR raw scans into undistorted LiDAR scans.

19 Claims, 5 Drawing Sheets

(56) References Cited

U.S. PATENT DOCUMENTS

| | | | |
|---|---|---|---|
| 9,091,535 B2* | 7/2015 | Baeg | G01S 7/4817 |
| 9,285,477 B1* | 3/2016 | Smith | G01S 17/89 |
| 9,304,203 B1* | 4/2016 | Droz | G01S 7/486 |
| 9,383,753 B1* | 7/2016 | Templeton | G01S 17/86 |
| 2009/0306881 A1* | 12/2009 | Dolgov | G06K 9/6297 |
| | | | 701/28 |
| 2011/0074620 A1* | 3/2011 | Wintermantel | G01S 7/285 |
| | | | 342/70 |
| 2012/0061141 A1* | 3/2012 | Rossing | E21B 47/024 |
| | | | 175/45 |
| 2014/0160276 A1* | 6/2014 | Pliefke | B60R 1/00 |
| | | | 348/118 |
| 2014/0300732 A1* | 10/2014 | Friend | G06T 7/73 |
| | | | 348/135 |
| 2015/0083851 A1* | 3/2015 | Moser | B64C 13/16 |
| | | | 244/99.2 |
| 2015/0185244 A1* | 7/2015 | Inoue | G01P 3/68 |
| | | | 356/5.09 |
| 2015/0293228 A1* | 10/2015 | Retterath | G01S 7/481 |
| | | | 356/5.01 |
| 2016/0196664 A1* | 7/2016 | Sebastian | G01C 11/02 |
| | | | 348/50 |
| 2016/0280261 A1* | 9/2016 | Kyrtsos | G01H 17/00 |
| 2016/0368336 A1* | 12/2016 | Kahn | G01B 11/26 |
| 2017/0315560 A1* | 11/2017 | Sun | A01D 34/008 |
| 2018/0033160 A1* | 2/2018 | Ishigami | G06T 7/73 |
| 2018/0284280 A1* | 10/2018 | Eichenholz | G01S 7/489 |
| 2018/0286909 A1* | 10/2018 | Eichenholz | G01S 17/10 |
| 2018/0299534 A1* | 10/2018 | LaChapelle | G01S 17/023 |
| 2019/0025429 A1* | 1/2019 | Mandava | G01P 21/02 |
| 2019/0154889 A1* | 5/2019 | McWhirter | G01S 7/4817 |
| 2020/0043186 A1* | 2/2020 | Selviah | G06K 9/6203 |

OTHER PUBLICATIONS

International Application No. PCT/US19/33371 International Search Report and Written Opinion dated Jul. 29, 2019.

* cited by examiner

SYSTEM AND METHOD FOR ANGLE MEASUREMENT

FIELD OF THE DISCLOSURE

The field of the disclosure is in general related to autonomous vehicles and, in particular, to a system and a method of measuring a trailer's angle of an autonomous truck.

BACKGROUND OF THE DISCLOSURE

In recent years, an increasing amount of interest and research effort has been put toward intelligent or autonomous vehicles. Autonomous driving for a truck is a special field in the autonomous driving industry and has some requirements different from those of other autonomous vehicles. One of the elements that distinguish an autonomous truck from an autonomous car is that a truck, as a cargo freighter, comes with a trailer at the back. Trailer angle and its angular velocity with respect to the pilot cabin play important roles in high-level autonomous control algorithm such as model predictive control (MPC).

BRIEF SUMMARY OF THE DISCLOSURE

Various objects, features, aspects and advantages of the present embodiment will become more apparent from the following detailed description of embodiments of the embodiment, along with the accompanying drawings in which like numerals represent like components.

Embodiments of the present disclosure provide a method of measuring an angle between a first portion of a moving object and a second portion of the moving object, for a non-transitory computer readable storage medium storing one or more programs. The one or more programs include instructions, which when executed by a computing device, cause the computing device to perform the following steps comprising: generating a point cloud representing information on a relative position of a front edge of the second portion with respect to the first portion; and calculating an angle between the first portion and the second portion from the point cloud.

In an embodiment, generating the point cloud is by a LiDAR.

In another embodiment, calculating the angle between the first portion and the second portion comprises filtering the point cloud with a predetermined threshold range.

In yet another embodiment, calculating the angle between the first portion and the second portion comprises performing coordinate change on the point cloud.

In still another embodiment, performing coordinate change comprises turning the point cloud from polar coordinate into Cartesian coordinate.

In an embodiment, calculating the angle between the first portion and the second portion comprises performing linear fitting on the point cloud.

In another embodiment, performing linear fitting comprises a least squares method.

In yet another embodiment, calculating the angle between the first portion and the second portion comprises performing a data averaging on a plurality of calculated angles.

In still another embodiment, performing the data averaging comprises a moving average method.

In an embodiment, the method further comprises calculating an angular velocity from a plurality of calculated angles.

Embodiments of the present disclosure also provide a system for measuring an angle between a first portion of a moving object and a second portion of the moving object. The system comprises an internet server, comprising: an I/O port, configured to transmit and receive electrical signals to and from a client device; a memory; one or more processing units; and one or more programs stored in the memory and configured for execution by the one or more processing units, the one or more programs including instructions for: generating a point cloud representing information on a relative position of a front edge of the second portion with respect to the first portion; and calculating an angle between the first portion and the second portion from the point cloud.

In another embodiment, generating the point cloud is by a LiDAR.

In yet another embodiment, calculating the angle between the first portion and the second portion comprises filtering the point cloud with a predetermined threshold range.

In still another embodiment, calculating the angle between the first portion and the second portion comprises performing coordinate change on the point cloud.

In an embodiment, performing coordinate change comprises turning the point cloud from polar coordinate into Cartesian coordinate.

In another embodiment, calculating the angle between the first portion and the second portion comprises performing linear fitting on the point cloud.

In yet another embodiment, calculating the angle between the first portion and the second portion comprises performing a data averaging on a plurality of calculated angles.

In still another embodiment, performing the data averaging comprises a moving average method.

In still another embodiment, the system further comprises calculating an angular velocity from a plurality of calculated angles.

Embodiments of the present disclosure also provide an autonomous vehicle. The autonomous vehicle comprises the system mentioned above; a first portion; a second portion towed by the first portion; and a LiDAR projecting beams from one of the first portion and the second portion toward the other one of the first portion and the second portion.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Any alterations and modifications in the described embodiments, and any further applications of principles described in this document are contemplated as would normally occur to one of ordinary skill in the art to which the disclosure relates. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment.

In the drawings, the figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

The appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result.

In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Reference is now made to the drawings wherein like numerals refer to like parts throughout.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Iridium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

Information about a trailer angle and its angular velocity with respect to the pilot cabin is important for motion planning during autonomous driving. Hence, how to measure the trailer angle of the autonomous truck with high accuracy becomes an important and pioneering topic where few companies or academic institutes have ever come up with a stable or practical solution.

Since autonomous driving for a truck may still be at the very pioneering stage, few related topics or solutions have been reported for measuring a truck's trailer angle. Some work proposes using a mechanical angle measuring device in the junction between the pilot cabin and the trailer. However, such device would suffer up-and-down bumping or all-around vibration during truck driving. The bumping or the vibration might reduce the life time of the device. A mechanical measuring device would also require long hour endurance test and accuracy guarantee before put into commercial use, and require frequent calibration after implementation.

The trailer angle detection faces many challenges. For example, there are many noise sources in the environment. Noise sources pose a challenge to successfully filter out outlier points throughout a calculation process during detection. When a light detection and ranging (LiDAR) is used in the detection, there might be extreme conditions where a side of the trailer is also detected by the LiDAR. Consequently, side points thus inadvertently taken should be excluded from the calculation. The calculation may involve a least squares method computation.

The present disclosure provides a method and a system to achieve high-accuracy measurement of an angle or an angular velocity between a first portion of a moving object and a second portion of the moving object. The moving object may be a truck. The first portion may be a pilot cabin, while the second portion may be a trailer towed by the pilot cabin. Some embodiments of the present disclosure use light detection and ranging (LiDAR) as the source of angle measurement to achieve a stable, responsive and accurate solution for detecting a front edge of the trailer. The LiDAR may be a single beam LiDAR. A single beam LiDAR is relatively inexpensive among all types of LiDAR, and thus may be cost efficient. Some embodiments of the present disclosure provide a computationally-efficient and fast-forward algorithm to compute the angle. Some embodiments of the present disclosure provide a filtering algorithm to make the raw measurement more accurate and believable.

In some embodiments, a point cloud generated by a single beam LiDAR or any kind of a scanning laser rangefinder is taken as an input of the calculation process, from which the angle and angular velocity is calculated and output. Between the input and output, there may be some data processing steps.

In some embodiments in accordance with the present disclosure, a non-transitory, i.e., non-volatile, computer readable storage medium is provided. The non-transitory computer readable storage medium is stored with one or more programs. When the program is executed by the processing unit of a computing device, the computing device is caused to conduct specific operations set forth below in accordance with some embodiments of the present disclosure.

Figure 5:
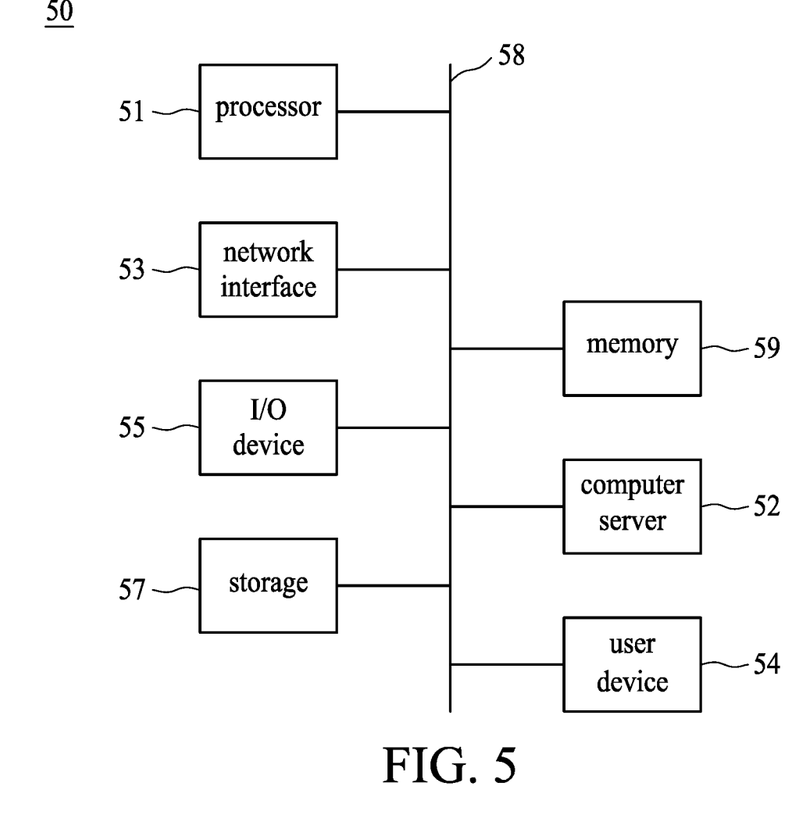
FIG. 5 is a block diagram of a system for measuring an angle between a first portion of a moving object and a second portion of the moving object, in accordance with some embodiments.

In some embodiments, as illustrated in FIG. 5, examples of non-transitory storage computer readable storage medium may include magnetic hard discs, optical discs, floppy discs, flash memories, or forms of electrically programmable memories (EPROM) or electrically erasable and programmable (EEPROM) memories. In certain embodiments, the term "non-transitory" may indicate that the storage medium is not embodied in a carrier wave or a propagated signal. In some embodiments, a non-transitory storage medium may store data that can, over time, change (e.g., in RAM or cache).

In some embodiments in accordance with the present disclosure, in operation, a client application is transmitted to the computing device upon a request of a user, for example, by a user device 54 such as a smart phone capable of downloading the application from a computer server. In operation, the application is installed at the vehicle. Accordingly, specific functions may be executed by the user through a computing device, such as calibrating sensors and time synchronization, and, for example, sending and receiving calibration files for data alignment purposes.

Figure 1A:
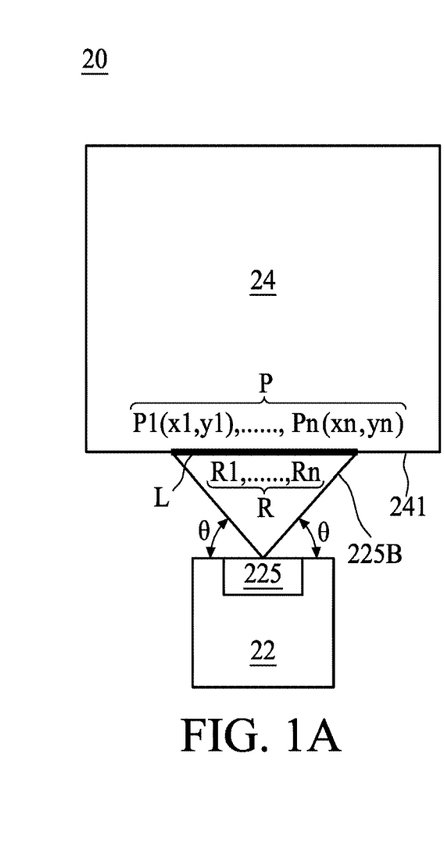
FIGS. 1A to 1C show a moving object at different states, in accordance with some embodiments.
Figure 1B:
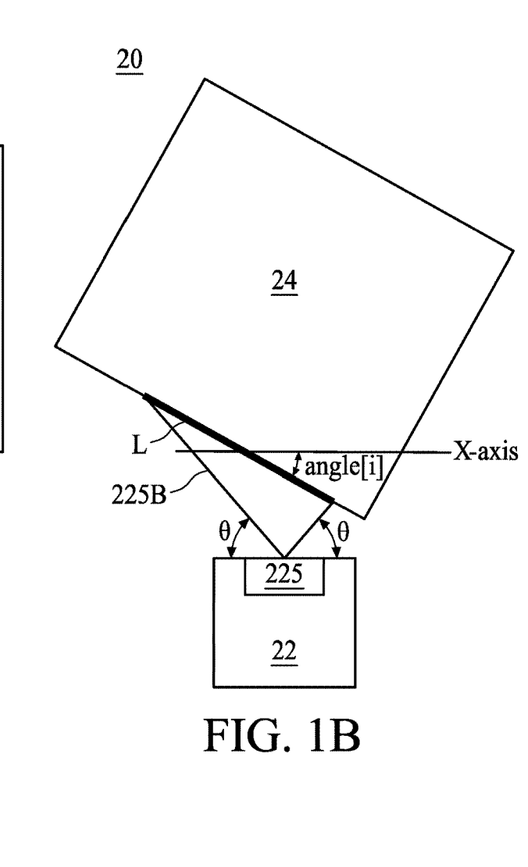
Figure 1C:
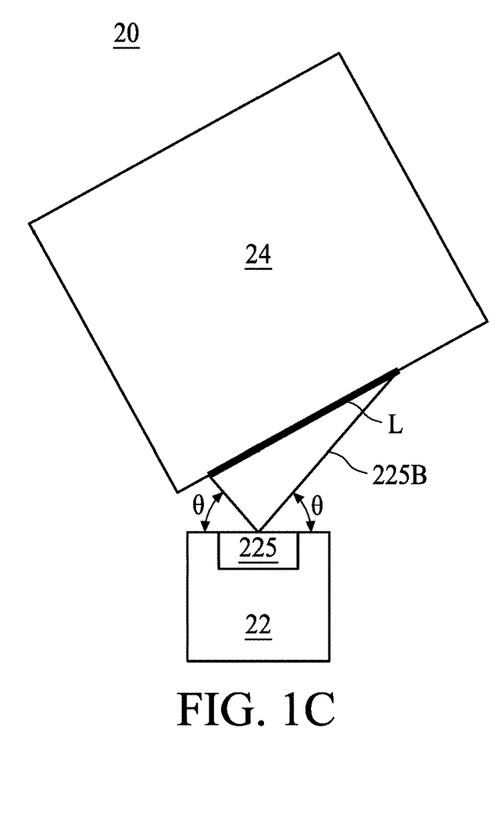

FIGS. 1A to 1C show a moving object 20 at different states. Referring to FIG. 1A, the moving object 20 includes a first portion 22, a second portion 24 and a LiDAR 225. The first portion 22 includes a pilot cabin, while the second portion 24 is a trailer towed by the first portion 22. The LiDAR 225 may be mounted on or installed in the first portion 22, and projects light beam from the first portion 22 toward the second portion 24. The relative position or an angle between the first portion 22 and the second portion 24 varies in different states as shown in FIGS. 1A to 1C. For example, FIG. 1A illustrates a state that the moving object 22 moves in a straight direction. FIG. 1B illustrates a state that the moving object 22 is on the way of turning left. FIG. 1C illustrates a state that the moving object 22 is on the way of turning right.

Figure 2:
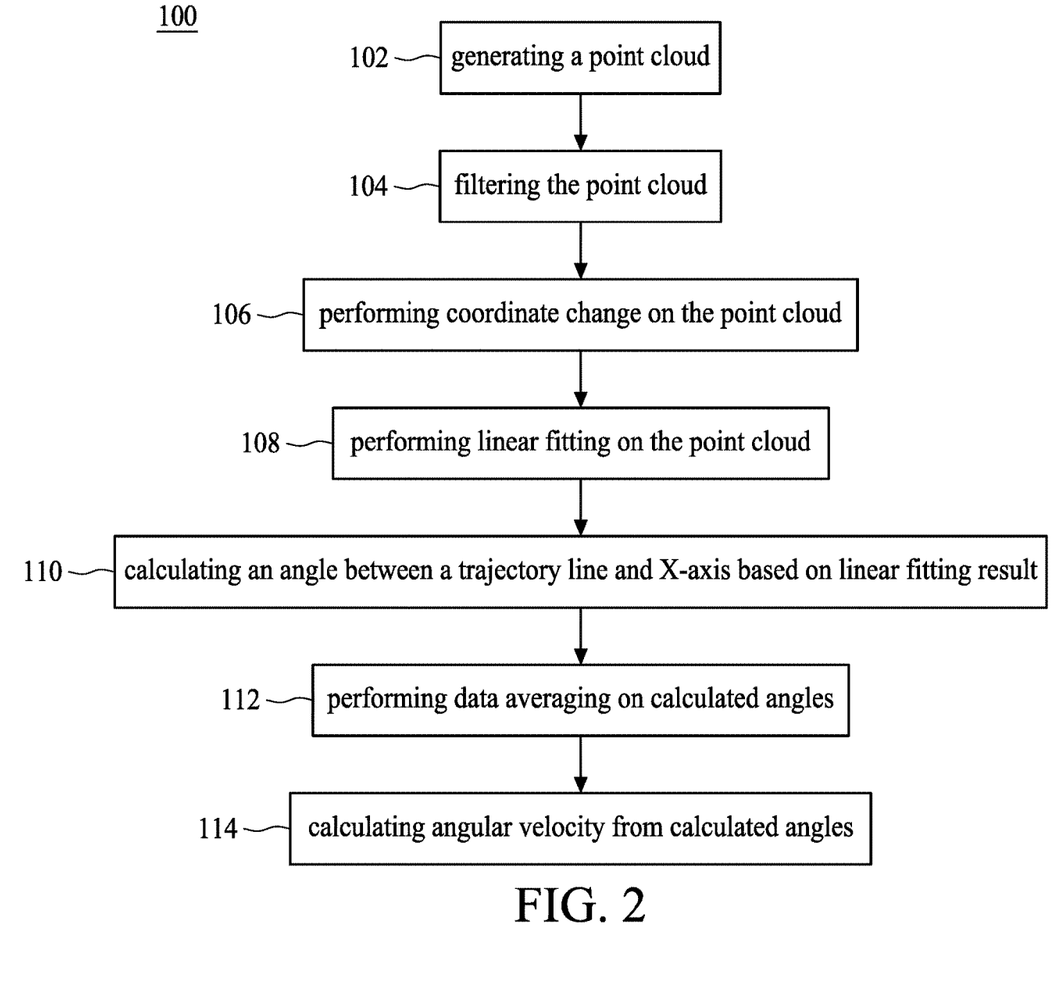
FIG. 2 is a flow diagram showing a method of measuring an angle between a first portion of a moving object and a second portion of the moving object, in accordance with some embodiments.

FIG. 2 is a flow diagram showing a method 100 of measuring an angle between a first portion of a moving object and a second portion of the moving object, in accordance with some embodiments of the present disclosure.

Referring to FIG. 2 and FIGS. 1A to 1C, in operation 102, a raw point cloud P within a light beam range 225B of the LiDAR 225 is generated. In an embodiment, the LiDAR 225 includes a 2D LiDAR. The point cloud P corresponds to a trajectory or a line L projected on a surface or an edge 241 of the second portion 24 by the LiDAR 225 during a swing of the LiDAR 225. In addition, the point cloud P represents information on a relative position of the edge 241 with respect to the first portion 22. The point cloud P includes a plurality of points P1 to Pn on the trajectory L, wherein n is the number of points. The point cloud P carries information about a range collection R. The range collection R includes distances R1 to Rn, which are the respective distances between P1 to Pn and the position of the LiDAR 225. For example, R1 is the distance between P1 and the LiDAR 225. The LiDAR 225 may have a scanning angle range (−θ, θ) and an angle step by which the LiDAR 225 swings in the scanning angle range. In some embodiments, the scanning angle range is (−30°,30°), and the angle step is 0.35°.

In operation 104, the point cloud P is filtered with a predetermined threshold range. For example, in some embodiments, the LiDAR 225 supports a range between 1 meter (m) and 2.5 m, which can be set as the threshold range. Points that are located outside the threshold range are filtered to facilitate calculation. For example, points within a range shorter than approximately 1 m or longer than approximately 2.5 m are filtered before further processing. A point outside the threshold range may be affected by various environmental noise sources and thus are filtered to improve the precision of calculation.

In operation 106, a coordinate change is performed on the point cloud P. In some embodiments, the coordinate change includes turning the point cloud P from a polar coordinate into a Cartesian coordinate. For example, an X-Y 2D Cartesian coordinate about an origin point or a central point (0, 0) of the LiDAR 225 can be constructed. Then each point Pi in the point cloud P, with its range Ri and the corresponding angle θi of the LiDAR 225 given, can be mapped from a polar coordinate into the Cartesian coordinate using the following formula.

$$xi = Ri \cos \theta i, yi = Ri \sin \theta i$$

In operation 108, a linear fitting is performed on the point cloud P. In some embodiments, the linear fitting includes a least squares method. A least squares method is an efficient way to compute an angle under a Cartesian coordinate. The trajectory L of the point cloud P can be represented by a linear formula y=kx+b, and a linear fitting can be realized with the following formula.

$$k = \frac{\sum_{i=1}^{n} x_i y_i - n\bar{x}\bar{y}}{\sum_{i=1}^{n} x_i^2 - n\bar{x}^2},$$

wherein $$\bar{x} = \frac{1}{n}\sum_{i=1}^{n} x_i, \text{ and } \bar{y} = \frac{1}{n}\sum_{i=1}^{n} y_i$$

After the linear fitting is completed, the trajectory L of the point cloud P is obtained. The trajectory L corresponds to the outline or the position of the edge 241 on the X-Y 2D Cartesian coordinate, with the position of LiDAR 225 as the origin point.

In operation 110, an angle A[i] between the trajectory L:y=kx+b and the X-axis can be calculated. A[i] corresponds to P[i], which is the point cloud P formed by the LiDAR 225 at the i-th swing, wherein i is a positive integer. The result corresponds to the angle between the first portion 22 and the second portion 24. Calculating an angle from a linear formula on a Cartesian coordinate can be done with various well-known methods, such as by the formula's normal vector or slope.

In operation 112, a data averaging is performed on a plurality of calculated angles A[i]. The reason for a data averaging is that, even though some noises and outliers may have been filtered out from the raw point cloud P with a threshold range, there still remains some white noise on the data itself. One observation is that even when a trailer keeps in still pose (not moving around at all), the angle data is still vibrating significantly (or variance is high). For example, some simulations show that the standard deviations of raw angles are 0.1356, 0.1466 and 0.1474 degrees, while the standard deviations of filtered angles are 0.0531, 0.0163 and 0.0658 degrees, respectively. A data averaging process can further optimize the computed angle data and make the result more reliable. In some embodiments, the data averaging includes a moving average method, for example, a weighted moving average method. When a weighted moving average is utilized, the current observation or calculated value is not output directly, rather, the previous n samples of data are taken into the averaging process by weights. For example, a linear weighted method can be used, which is simple to implement and can achieve a relative stable result. Let the sample number be 20, then the formula for such averaging method is as below.

$$A[i] = (20 \times A[i] + 19 \times A[i-1] + \ldots + 1 \times A[i-20])/(20 + \ldots + 1)$$

Figure 3:
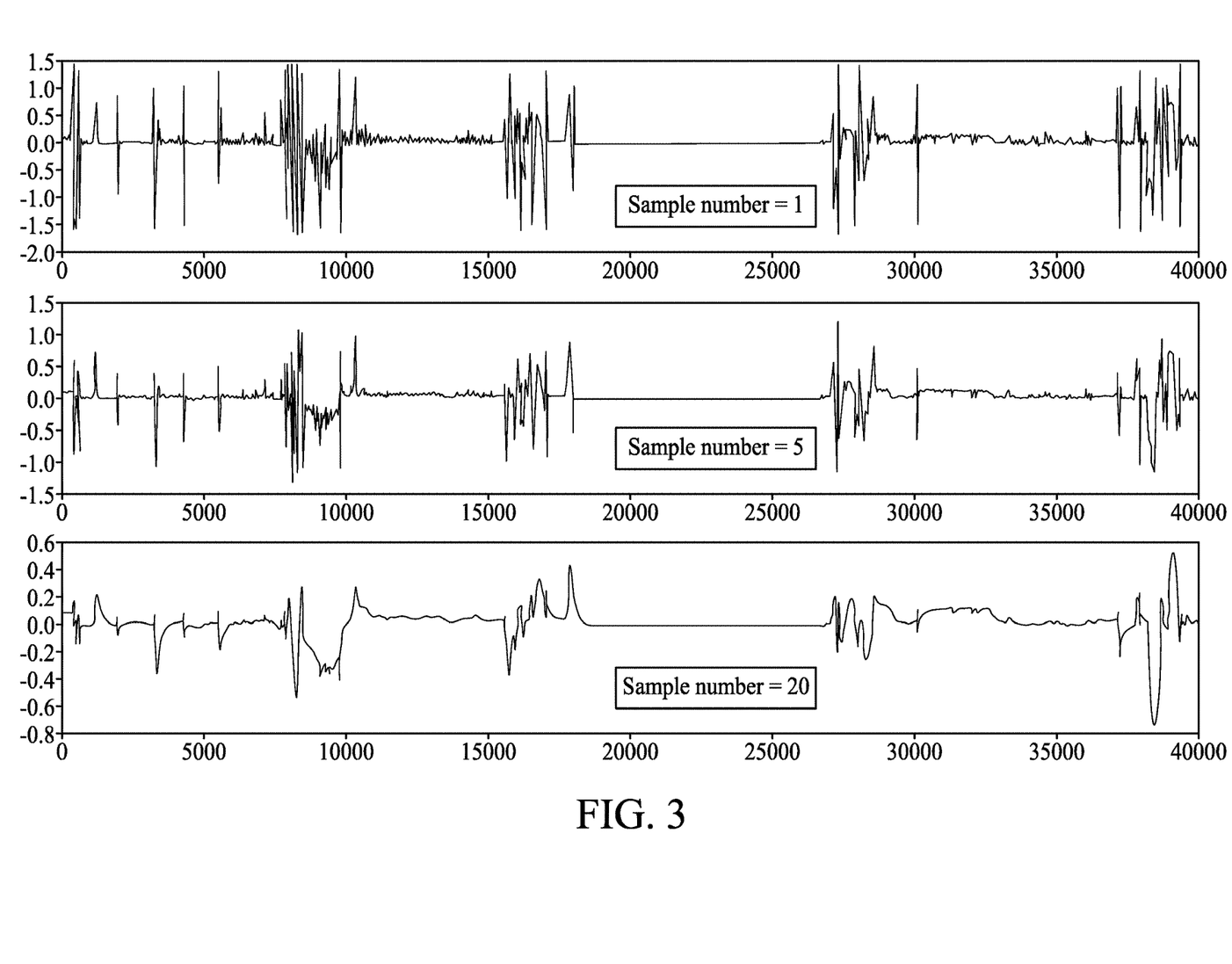
FIG. 3 shows the effect of data averaging for different sample numbers, in accordance with some embodiments.

FIG. 3 shows the effect of data averaging for different sample numbers. The data with sample number=1 is the raw data. As shown in FIG. 3, the white noise is effectively filtered and alleviated using the weighted moving average method. Note that the weighted method advantages over an unweighted one in that it is more adapted to immediate changes, so the calculation or the system is more responsive.

In operation 114, an angular velocity is calculated from the calculated angles. For example, a temporal time difference can be used to compute the angular velocity below:

$$V[i] = (A[i] - A[i-1])/TD$$

wherein V[i] is the angular velocity at the i time index and TD is the time difference.

Figure 4:
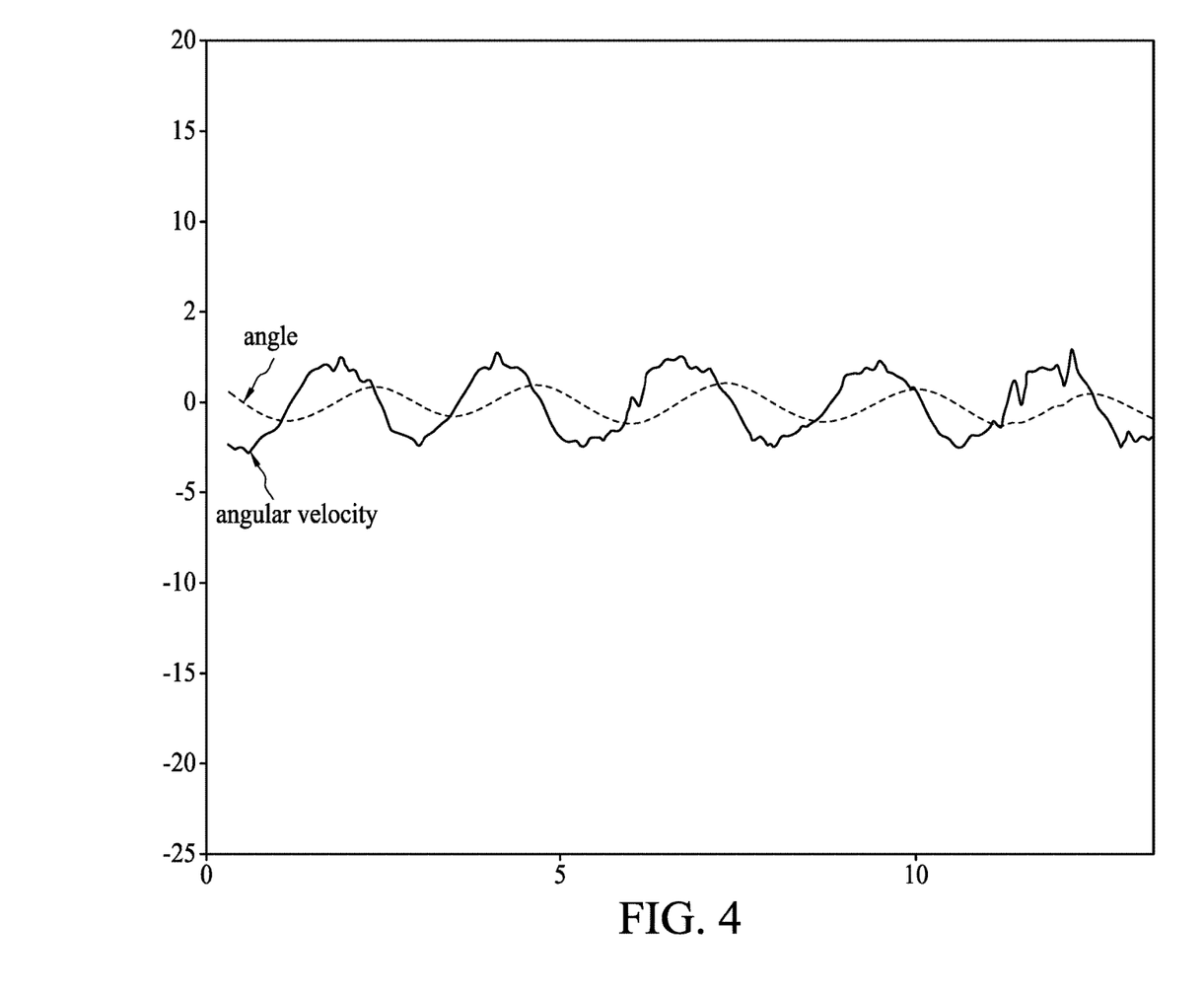
FIG. 4 shows an angle data and an angular velocity data.

FIG. 4 shows an example of an angle data and an angular velocity data calculated from the angle data. In this simulation, a flat board is used to simulate the second portion 24 or a trailer's movement with respect to the first portion 22 or a pilot cabin, giving it a sine input. As shown in the figure, the angle is quite smooth and looks like a sine wave. The angular velocity looks like a cosine wave (the velocity is the derivative of the angle, so it should be a cosine wave), though it is less smooth, but it is quite normal for the velocity to be a bit bumpy.

FIG. 5 is a block diagram of a system 50 for measuring an angle between a first portion of a moving object and a second portion of the moving object, in accordance with some embodiments.

Referring to FIG. 5, the system 50 includes a processor 51, a computer server 52, a network interface 53, an input and output (I/O) device 55, a storage device 57, a memory 59, and a bus or network 58. The bus 58 couples the network interface 53, the I/O device 55, the storage device 57 and the memory 59 to the processor 51.

Accordingly, the processor 51 is configured to enable the computer server 52, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 51, the computer server 52, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 52 is configured to utilize the I/O port 55 to communicate with external devices via a network 58, such as a wireless network. In certain embodiments, the I/O port 55 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 62 is configured to utilize the I/O port 55 to wirelessly communicate with a client device 54, such as a mobile phone, a tablet PC, a portable laptop or any other computing device with internet connectivity. Accordingly, electrical signals are transmitted between the computer server 52 and the client device 54.

In some embodiments in accordance with the present disclosure, the computer server 52 is a virtual server capable of performing any function a regular server has. In certain embodiments, the computer server 52 is another client device of the system 50. In other words, there may not be a centralized host for the system 50, and the client devices 54 in the system are configured to communicate with each other directly. In certain embodiments, such client devices 54 communicate with each other on a peer-to-peer (P2P) basis.

The processor 51 is configured to execute program instructions that include a tool module configured to perform a method as described and illustrated with reference to FIG. 2. Accordingly, in an embodiment in accordance with the method 100 illustrated in FIG. 2, the tool module is configured to execute the operations including: generating a point cloud representing information on a relative position of a front edge of the second portion with respect to the first portion, such as by a LiDAR; filtering the point cloud with a predetermined threshold range; performing coordinate change on the point cloud, such as turning the point cloud from polar coordinate into Cartesian coordinate; performing linear fitting on the point cloud; calculating an angle from the linear fitting result; performing a data averaging on a plurality of calculated angles, such as by a moving average method; and calculating an angular velocity from a plurality of calculated angles.

The network interface 53 is configured to access program instructions and data accessed by the program instructions stored remotely through a network (not shown).

The I/O device 55 includes an input device and an output device configured for enabling user interaction with the system 50. In some embodiments, the input device comprises, for example, a keyboard, a mouse, and other devices.

Moreover, the output device comprises, for example, a display, a printer, and other devices.

The storage device 57 is configured for storing program instructions and data accessed by the program instructions. In some embodiments, the storage device 57 comprises, for example, a magnetic disk and an optical disk.

The memory 59 is configured to store program instructions to be executed by the processor 51 and data accessed by the program instructions. In some embodiments, the memory 59 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 59 is incorporated into the processor 51.

Thus, specific embodiments and applications have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A method of measuring an angle and an angular velocity between a first portion of a moving object and a second portion of the moving object comprising:
   (i) generating, using a light detection and ranging (LiDAR) device or a scanning laser rangefinder, a point cloud representing information on a relative position of a front edge of the second portion with respect to the first portion;
   (ii) calculating an angle between the first portion and the second portion from the point cloud;
   (iii) repeating steps (i) and (ii) to generate a plurality of calculated angles;
   (iv) calculating a weighted moving average from the plurality of calculated angles, wherein a later calculated angle of the plurality of calculated angles has a higher weight than an earlier calculated angle of the plurality of calculated angles; and
   (v) calculating an angular velocity from the plurality of calculated angles.

2. The method according to claim 1 wherein calculating the angle between the first portion and the second portion comprises filtering the point cloud with a predetermined threshold range.

3. The method according to claim 2 wherein points of the point cloud located outside the predetermined threshold range of distances are filtered out.

4. The method according to claim 3 wherein the predetermined threshold range is between 1 meter and 2.5 meters.

5. The method according to claim 1 wherein calculating the angle between the first portion and the second portion comprises performing coordinate change on the point cloud.

6. The method according to claim 5 wherein performing coordinate change comprises turning the point cloud from polar coordinate into Cartesian coordinate.

7. The method according to claim 1 wherein calculating the angle between the first portion and the second portion comprises performing linear fitting on the point cloud.

8. The method according to claim 7 wherein performing linear fitting comprises a least squares method.

9. The method according to claim 1 wherein weights of the plurality of calculated angles incrementally increase along with an order of the generation of the plurality of calculated angles.

10. The method according to claim 1 wherein the plurality of calculated angles are weighted linearly.

11. The method according to claim 1 wherein the angular velocity is calculated from the weighted moving average.

12. A system for measuring an angle and an angular velocity between a first portion of a moving object and a second portion of the moving object, the system comprising:
an internet server, comprising:
an I/O port, configured to transmit and receive electrical signals to and from a client device;
a memory;
a processor; and
one or more programs stored in the memory and configured for execution by the processor, the one or more programs comprising instructions for:
(i) generating, using a light detection and ranging (LiDAR) device or a scanning laser rangefinder, a point cloud representing information on a relative position of a front edge of the second portion with respect to the first portion;
(ii) calculating an angle between the first portion and the second portion from the point cloud;
(iii) repeating steps (i) and (ii) to generate a plurality of calculated angles;
(iv) calculating a weighted moving average from the plurality of calculated angles, wherein a later calculated angle of the plurality of calculated angles has a higher weight than an earlier calculated angle of the plurality of calculated angles; and
(v) calculating an angular velocity from the plurality of calculated angles.

13. The system according to claim 12 wherein calculating the angle between the first portion and the second portion comprises filtering the point cloud with a predetermined threshold range.

14. The system according to claim 12 wherein calculating the angle between the first portion and the second portion comprises performing coordinate change on the point cloud.

15. The system according to claim 14 wherein performing coordinate change comprises turning the point cloud from polar coordinate into Cartesian coordinate.

16. The system according to claim 12 wherein calculating the angle between the first portion and the second portion comprises performing linear fitting on the point cloud.

17. An autonomous vehicle, comprising:
the system according to claim 12;
a first portion;
a second portion towed by the first portion; and
a LiDAR projecting beams from one of the first portion and the second portion toward the other one of the first portion and the second portion.

18. The system according to claim 12 wherein a scanning angle of the LiDAR is in a range of 0° to 120°.

19. The system according to claim 12 wherein an angle step of a scanning of the LiDAR is 0.35°.

* * * * *